(12) United States Patent
Onthank

(10) Patent No.: US 11,399,512 B2
(45) Date of Patent: Aug. 2, 2022

(54) LIGHT UP BUCKLE FOR USE WITH A DOG COLLAR

(71) Applicant: Nano Pet Products, LLC, Norwalk, CT (US)

(72) Inventor: Christopher Howse Onthank, Norwalk, CT (US)

(73) Assignee: Nano Pet Products, LLC, Norwalk, CT (US)

( * ) Notice: Subject to any disclaimer, the term of this patent is extended or adjusted under 35 U.S.C. 154(b) by 152 days.

(21) Appl. No.: 16/584,155

(22) Filed: Sep. 26, 2019

(65) Prior Publication Data
US 2020/0093098 A1   Mar. 26, 2020

(30) Foreign Application Priority Data

Sep. 26, 2018  (NL) ...................................... 2021713

(51) Int. Cl.
*A01K 27/00* (2006.01)
*A44B 11/25* (2006.01)

(52) U.S. Cl.
CPC .......... *A01K 27/006* (2013.01); *A01K 27/001* (2013.01); *A01K 27/005* (2013.01)

(58) Field of Classification Search
CPC .. A01K 27/006; A01K 27/001; A01K 27/005; A44B 11/2565
See application file for complete search history.

(56) References Cited

U.S. PATENT DOCUMENTS 6,098,252 A * 8/2000 Woerth, Jr. .......... A44B 11/001
                                                        24/163 K
6,805,460 B1 * 10/2004 Zoller .................. A01K 27/006
                                                        362/103

(Continued)

FOREIGN PATENT DOCUMENTS

CN          108741450       11/2018

*Primary Examiner* — Kristen C Hayes
(74) *Attorney, Agent, or Firm* — Peacock Law P.C.; Janeen Vilven

(57) ABSTRACT

The invention discloses a light up buckle for use with a dog collar. This buckle design comprises a Plastic Computer Board (PCB) which incorporates LED's, a mini-USB port, a switch and a rechargeable battery. The lithium-ion battery is housed within the buckle assembly and is protected from water by means of rubber seals when the buckle is in the closed or locked position.
The main components are molded from translucent plastic, to allow the LED's to illuminate the assembly when switched on. There are multiple settings for the LED's to allow for a steady illumination or various flashing/pulsing settings. The buckle is intended for illumination at night to aid the visibility of an owner's canine that wears the buckle on the collar.
The buckle can be fitted onto a collar strap or body harness and so has multiple uses and applications.
The buckle design is rounded and has smooth edges to ensure no discomfort is experienced by the canine. There is a trigger switch located on the underside of the buckle which is operated by pressing a rubber button that protrudes from the plastic casing.
The entire assembly is water-resistant, by means of two rubber components that interlock when the buckle is closed. The pressure between these two rubber plugs ensures water cannot get access to the electronics and battery.

8 Claims, 14 Drawing Sheets

(56) References Cited

U.S. PATENT DOCUMENTS

| | | | |
|---|---|---|---|
| 7,566,140 B2* | 7/2009 | Sevilla | F21V 33/0008 |
| | | | 362/108 |
| 8,863,362 B2* | 10/2014 | Kelleghan | A44B 11/266 |
| | | | 24/615 |
| 2002/0011219 A1* | 1/2002 | Chien | A44C 15/0015 |
| | | | 119/859 |
| 2007/0171629 A1 | 7/2007 | Langenwalter | |
| 2007/0180666 A1* | 8/2007 | Frye | A44B 11/005 |
| | | | 24/163 K |
| 2009/0177068 A1* | 7/2009 | Stivoric | A61B 5/002 |
| | | | 600/365 |
| 2011/0197826 A1 | 8/2011 | Hurwitz | |
| 2012/0085298 A1 | 4/2012 | Wolters | |
| 2015/0033794 A1* | 2/2015 | Ma | A01K 27/006 |
| | | | 63/1.13 |
| 2016/0223145 A1* | 8/2016 | Dai | F21L 4/08 |
| 2017/0020234 A1 | 1/2017 | Taylor | |
| 2018/0110205 A1* | 4/2018 | Czarnecky | G01S 19/14 |
| 2019/0230905 A1* | 8/2019 | Soder | A01K 11/008 |

* cited by examiner

Fig. 5
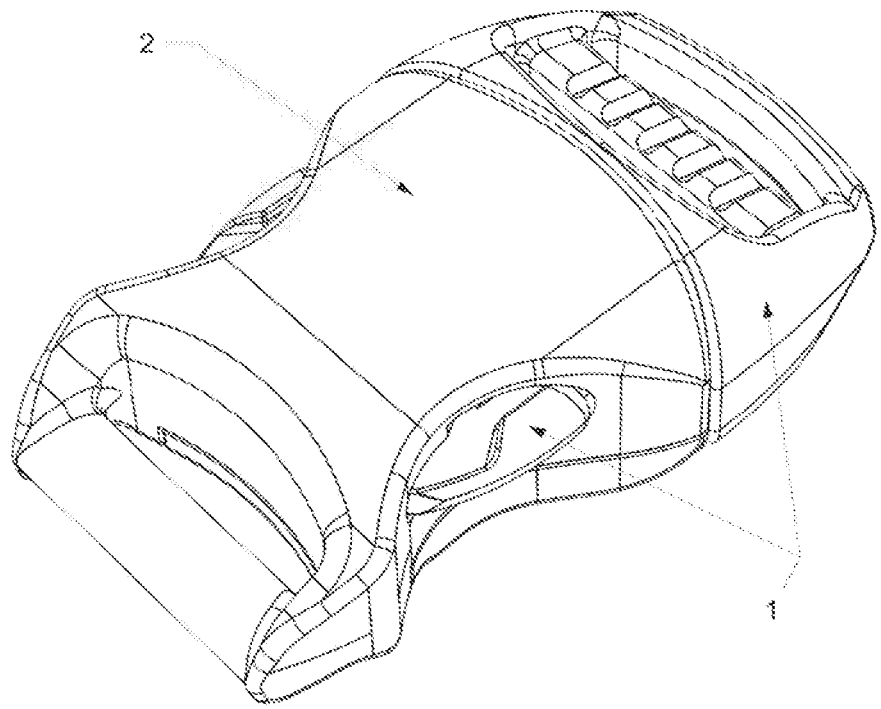
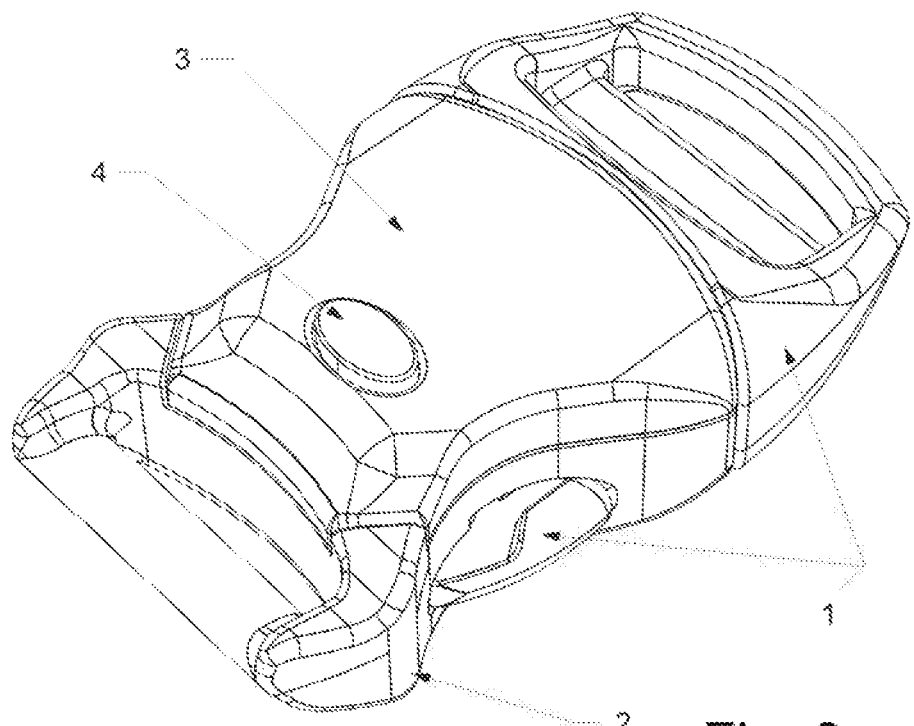
Fig. 6

Fig. 11
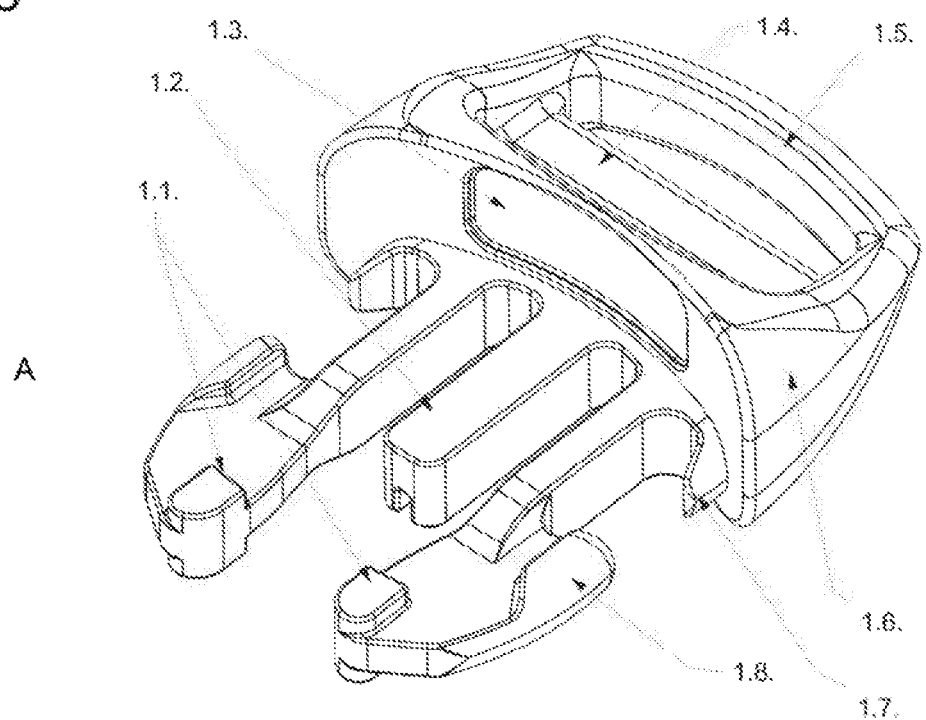
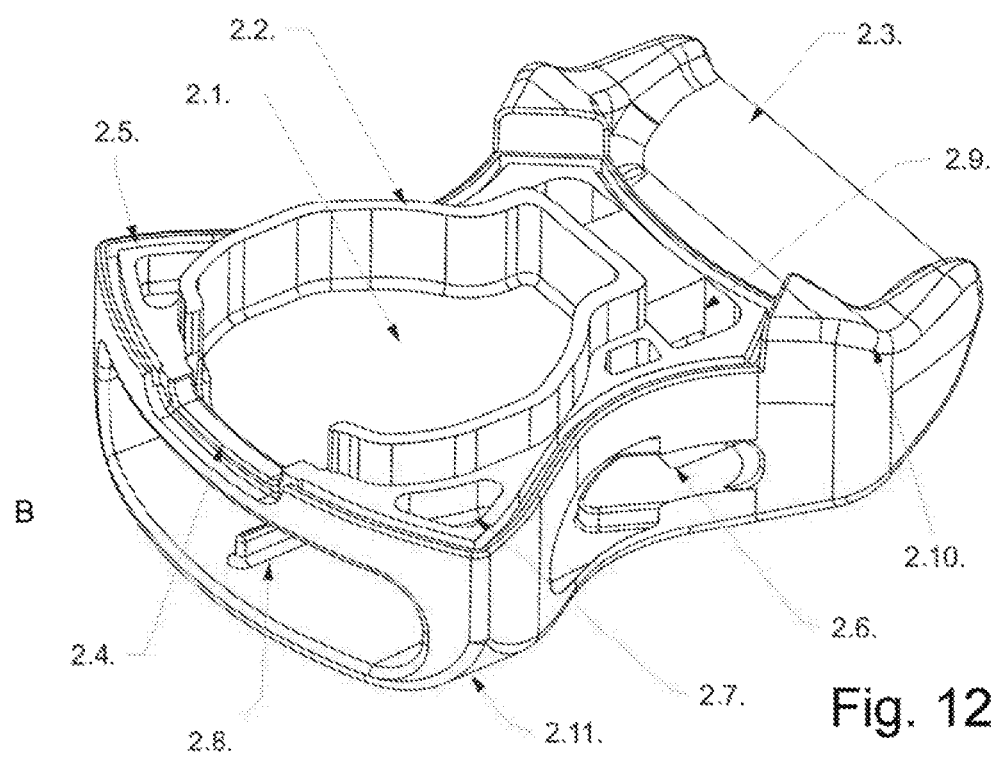
Fig. 12

Fig. 15
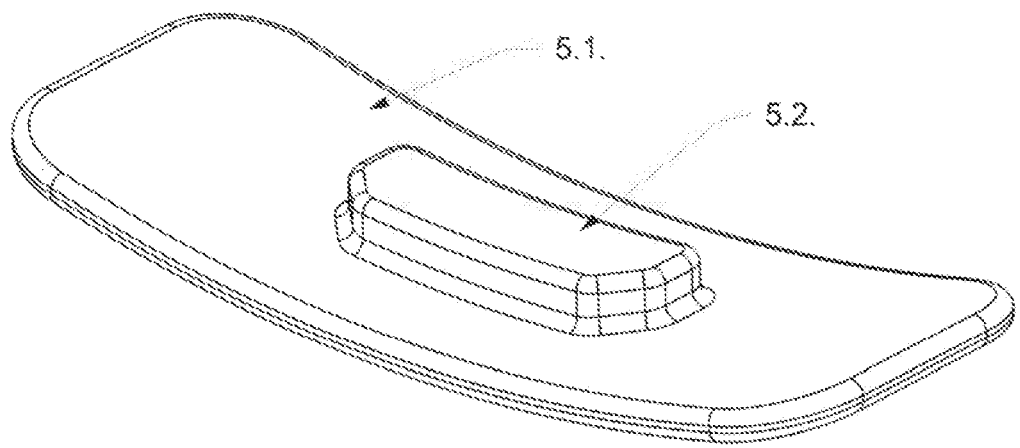
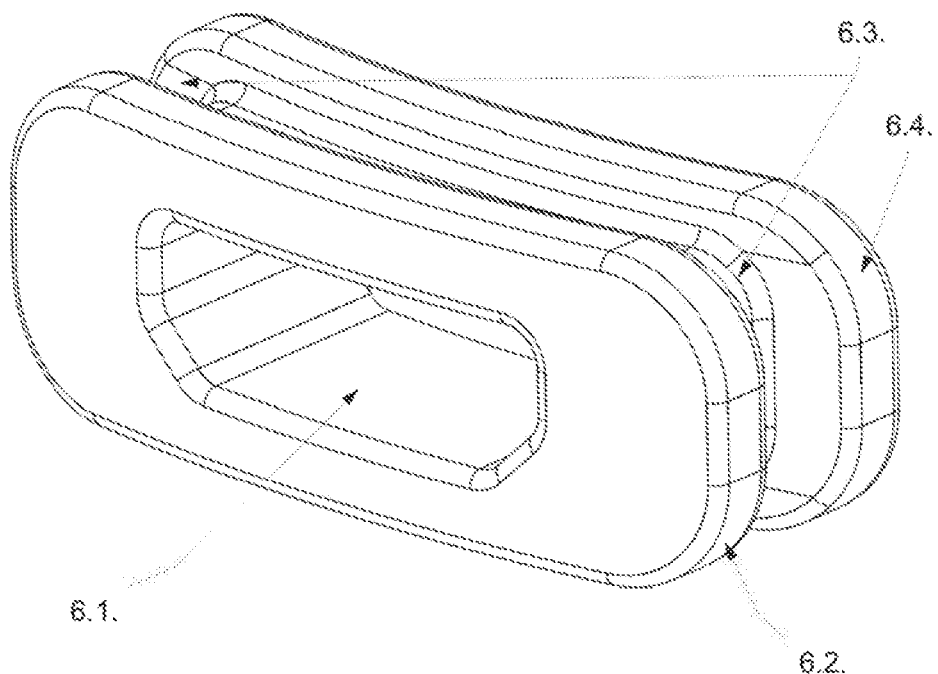
Fig. 16

Fig. 17
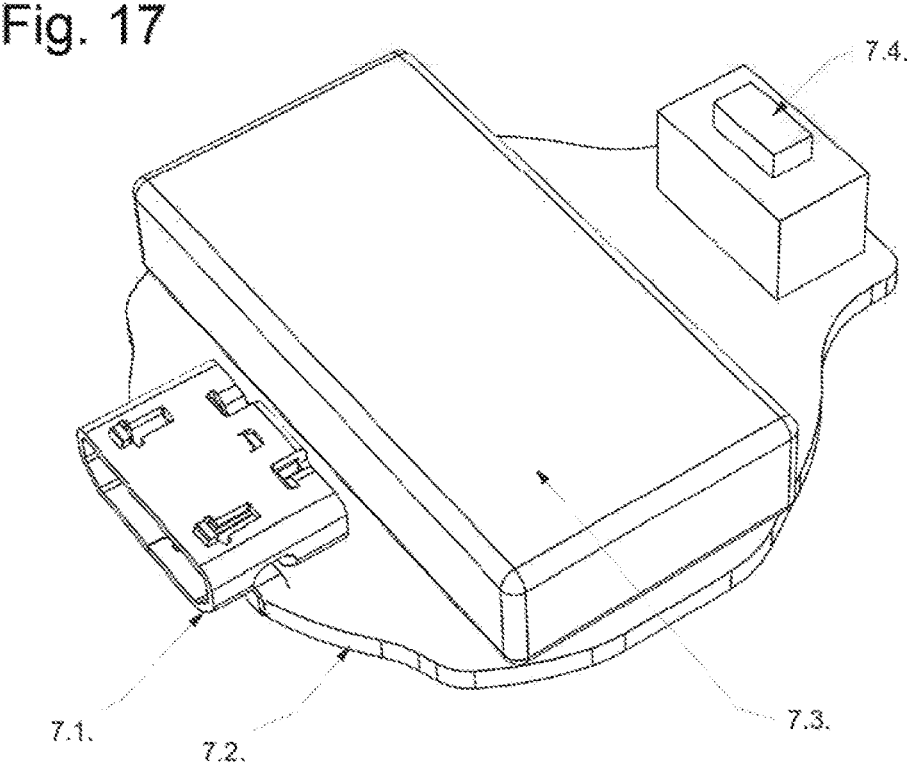
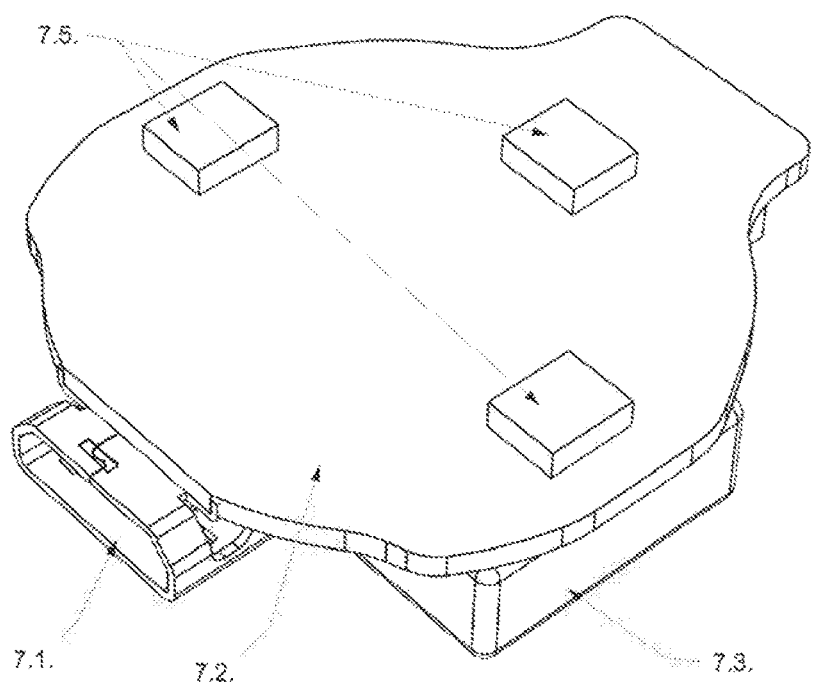
Fig. 18

LIGHT UP BUCKLE FOR USE WITH A DOG COLLAR

CROSS-REFERENCE TO RELATED APPLICATIONS

This application claims priority to and the benefit of the filing of Netherlands Patent Application No. 2021713, entitled "A LIGHT UP BUCKLE FOR USE WITH A DOG COLLAR", filed on Sep. 26, 2019. The specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

TECHNICAL FIELD

The present invention belongs to the technical field of pet products and devices, more specifically collar-buckles and harness-buckles for dogs.

BACKGROUND OF THE INVENTION

It is common for dogs to be outdoors at night or when it is dark. Many owners prefer their dogs to sleep outdoors, and so there are often times when a dog is in the dark and not visible to the owner. Also, when walking at night, if an owner allows a dog to run free from the leash, there may be times when the dog is not visible to the owner and so can easily become lost.

There are many instances where having a light on a dog's collar would make locating the dog easier, and also allow the owner/handler to follow the dog. In the case of police searches this would be particularly useful.

Currently on the market there are a number of lights that can be purchased for attachment to a dog's collar. Also, these lights are not waterproof and, in most cases, make use of disposable batteries.

There is a need, therefore, for an embodiment of the present invention that is:

Strong, durable and integrated design of a clip buckle and light solution.

The encapsulated electronics should be waterproof/water resistant.

The Buckle design should ensure that the electronics are protected from water and damage.

Have smooth, rounded geometry to be comfortable and an ergonomic design.

Be molded in a strong translucent material for illumination as well as durability.

BRIEF SUMMARY OF THE INVENTION

The technical problem solved by one or more embodiments of the present invention is to provide illumination to the plastic buckle body assembly, which operates under the control of a press switch. This buckle fits to various strapping thicknesses, without modifying the buckle geometry. The LED's on the Plastic Computer Board (PCB) cause sufficient illumination to the Buckle Body Assembly, so that it is visible from a substantial distance in the dark.

The design is compact and does not cause irritation to the dog when worn. All components such as PCB, switch, mini-USB and battery are contained efficiently within the Buckle Body Assembly.

Aspects of the LED Buckle for one or more embodiments of the present invention are as follows:

Three main Plastic molded components that assembly to create the Body of the Buckle. These are molded in Polycarbonate with an additive to enhance the refraction of light within the material. The surface of these parts are finished with a heavily frosted finish, to further aid in the even spread of light within the Assembly.

There are two rubber seals that are molded in Silicone or more durable TPR rubber as may be required for certain applications. These rubber seals are fitted to the two Sub Assembly Parts A (shown in FIG. 11) and Part B (shown in FIG. 12) so that they each form a fixed part of each Sub-assembly. When the Buckle parts A and Part B are clipped together, these two rubber seals make contact and create a water-tight seal. This is the protection against normal water egress, into the electronics cavity.

There is a compact Sub-Assembly comprised of the PCB, Lithium-Ion battery, mini-USB, LED's and Switch. Once this module is fitted into the buckle and the Body Part C (shown in FIG. 13) is glued in place, it is a permanent/locked assembly. The mini-USB is accessible when the Buckle Part A and Part B are unclipped, to allow for re-charging of the Lithium-Ion battery. One or more LED's may be provided, for example depending on the size of the buckle or on a preferred light pattern. When there are two or more LED's they preferably are spaced evenly on the underside of the PCB and preferably such to ensure the illumination faces outwards from the Dog's neck when the buckle is in use.

One or more embodiments of the present invention therefore relate to a buckle for use with a dog collar, comprising plastic polycarbonate buckle sub-assemblies that have integrated electronics and illumination. The sub-assemblies are parts that, when assembled, together form a buckle with illuminating properties. Hence, electronics are provided for ensuring said illuminating properties. The buckle may comprise parts that are applied analogously in other illuminating objects, like torches. A huge advantage of one or more embodiments of the present invention is that the light source for illumination purposes is built directly into the buckle. Hence, no additional objects are required for ensuring a proper illumination when required. Also, the chance that the light is lost when an owner wants to walk his dog is zero, since the dog always carries the light with him on the collar.

So as to ensure illumination and a proper functioning of the electronics, one or more embodiments of the present invention preferably relates to a buckle comprising a battery, preferably a rechargeable battery, for powering the electronics.

Since dogs stay out even when bad weather conditions exist, it is preferred that the buckle is able to withstand rain and other like conditions. The buckle thus preferably comprises a seal for shielding the electronics against water and moist.

It is especially preferred that the seal comprises a rubber interlock between two interconnectable sub-assemblies, since such ensures a long-lasting shielding.

So as to ensure a sufficient strong battery when walking a dog, the battery preferably comprises a connection for recharging the battery, preferably a mini-USB connection, and wherein a rubber interlock seals a mutually removable covering device around the connection. Such makes it easy to remove the covering device from the connection, such that the battery can be recharged and afterwards the covering device and the connection can be mutually connected, so as to ensure that the recharged battery is properly shielded from the environment. Another embodiment provides for solar charging of the battery.

An energy efficient light source is obtained when the illumination comprises a LED light source, the light source being properly connected to the battery through operatively connected electronics.

So as to ensure a proper functioning as a dogs buckle, the buckle according to one embodiment of the present invention is embodied for connecting two end-parts of a belt or a collar, preferably embodied for withstanding 700 pounds of static pull force.

It is especially preferred that the buckle is made of a sufficiently strong and to some extent transparent material. In such case, the light source may be provided at an inside of the buckle so as to shield it from the environment, especially water and moisture, whereas the light emitted by the light source is still visible from the outside of the buckle. The embodiment of the present invention therefore also relates to a buckle wherein the illumination is embodied for illuminating a polycarbonate part of said buckle, preferably such that the buckle is visible at a distance of at least 10 meters at night or in the dark. It is especially preferred that the buckle has a transparency of less than 100%, preferably less than 90%, more preferably less than 80%, and more than 50%, preferably more than 60%, still more preferably more than 70%. Such material will illuminate substantially completely when the light source emits light.

Finally, an embodiment of the present invention relates to a buckle comprising a connection for use on a dog collar or to a harness or other functional apparel.

BRIEF DESCRIPTION OF THE SEVERAL VIEWS OF THE DRAWINGS

FIG. 5 Buckle Assembly: Top Isometric View;
FIG. 6 Buckle Assembly: Bottom Isometric View;
FIG. 11 Buckle Body Part A: Isometric View;
FIG. 12 Buckle Body Part B: Isometric View;
FIG. 15 Rubber Seal Part A: Isometric View;
FIG. 16 Rubber Seal Part B: Isometric View;
FIG. 17 PCB, Switch, mini-USB and Battery: Isometric View;
FIG. 18 PCB, Switch, mini-USB and Battery: Bottom Isometric View.

DETAILED DESCRIPTION OF DRAWINGS

The detailed description of images will present the technical explanations of the components which the buckle consists of. The notable points of interaction between the components as well as their characteristics will be clearly described in connection with the drawings provided in this patent under the section titled images. The described embodiments are merely to explain the function and properties of the model and its components and are not intended to limit the scope of the buckle in any way.

Figure 1:
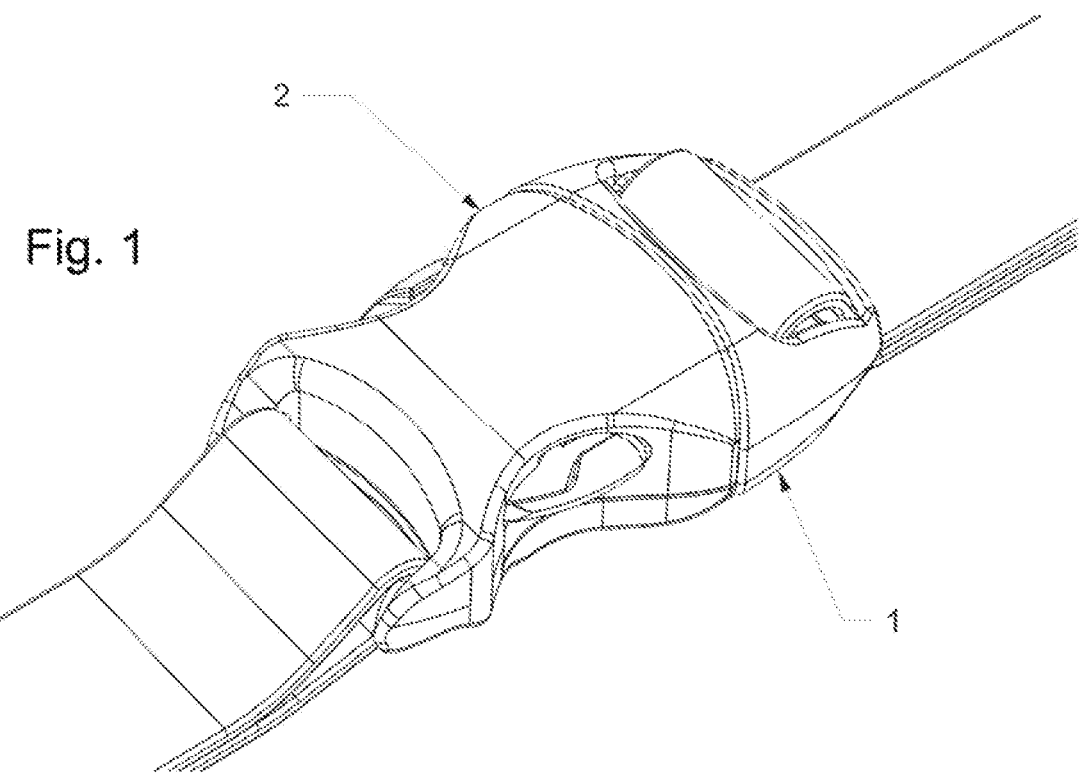
FIG. 1. Buckle Assembly with Straps: Top Isometric View.

FIG. 1 Buckle Assembly with Straps: Top Isometric View

This top isometric view shows the fully assembled buckle with straps fitted according to one embodiment of the present invention. Parts numbered "1" and "2" are clearly visible with the rest of the components concealed within the assembly.

Figure 2:
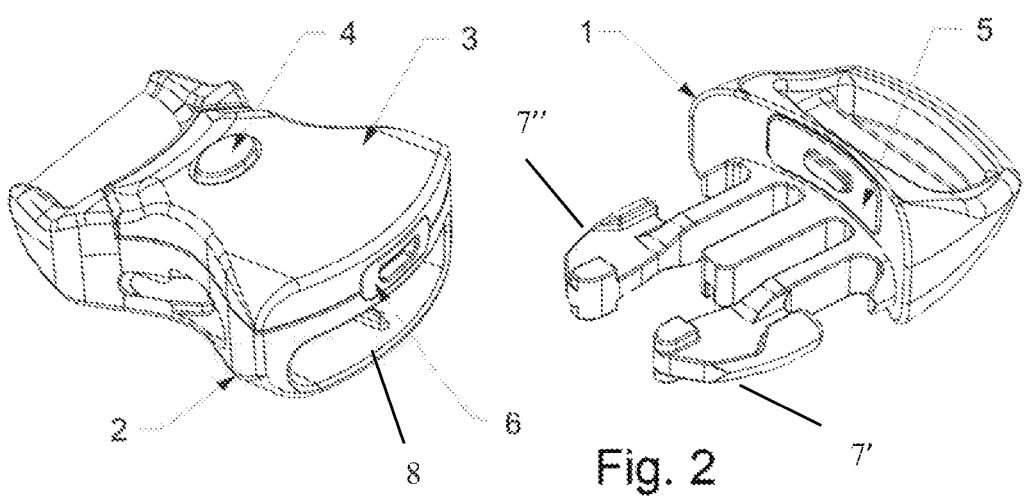
FIG. 2 Buckle Assembly: Exploded Angled Isometric View.

FIG. 2 Buckle Assembly: Exploded Angled Isometric View

The two Sub-Assemblies Part A and Part B are shown pulled apart and from underneath. Body Part A (1) is shown with Rubber Seal Insert Part A (5) fitted in place according to one embodiment of the present invention.

Body Part B (2) is assembled to Body Part C (3) with all electronics encased between. The rubber button (4) protrudes through body Part C (3) to allow the user to switch the LEDs on and off by means of the pressure switch. The Rubber Seal Part B (6) is visible here and the access to the mini-USB is now possible when the parts are separated as shown in the open configuration. Tines 7' and 7" fit inside and engage opening 8 in the closed configuration.

Figure 3:
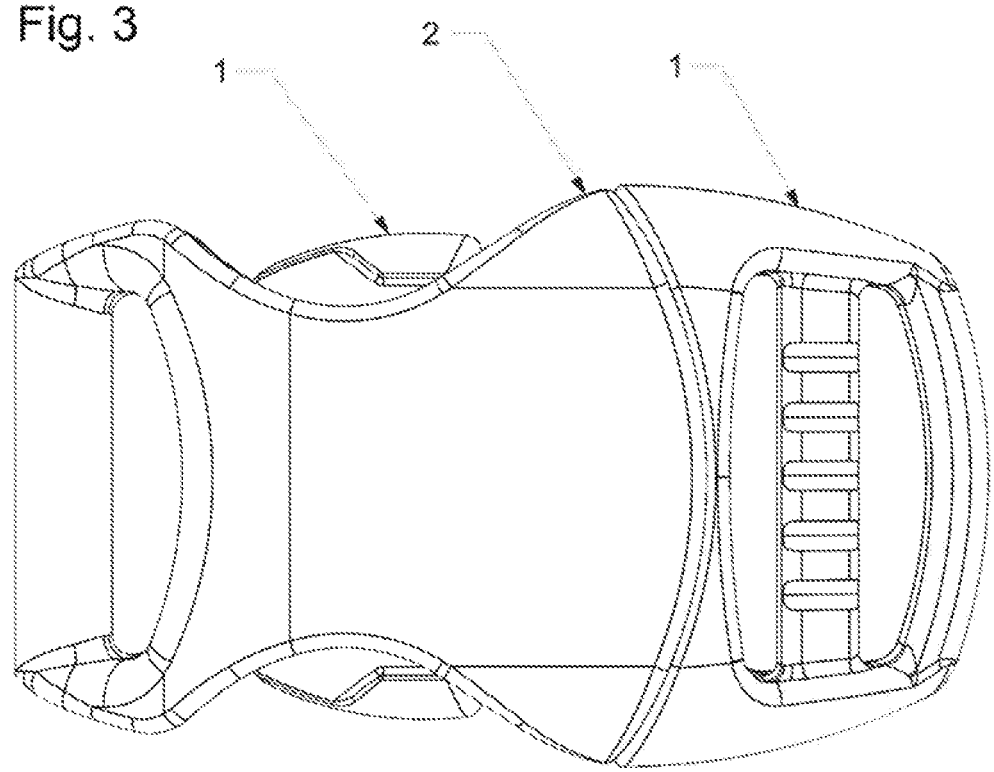
FIG. 3. Buckle Assembly: Top View.

FIG. 3 Buckle Assembly: Top View

The top view of one embodiment of the present invention shows the interface between the two Sub-Assemblies, and the overall continuation of the fluid geometry. The rubber seals are now concealed at the curved junction between Body Part A (1) and Body Part B and C (2 and 3). Openings 4 and 5 permit the collar to be associated with the Body Part A (1) and Body Part B and C (2 and 3).

The Wings of Body Part A (1) are visible in this "locked" position and are depressed from the outside to flex the wings inwards and allow the parts to disengage.

Figure 4:
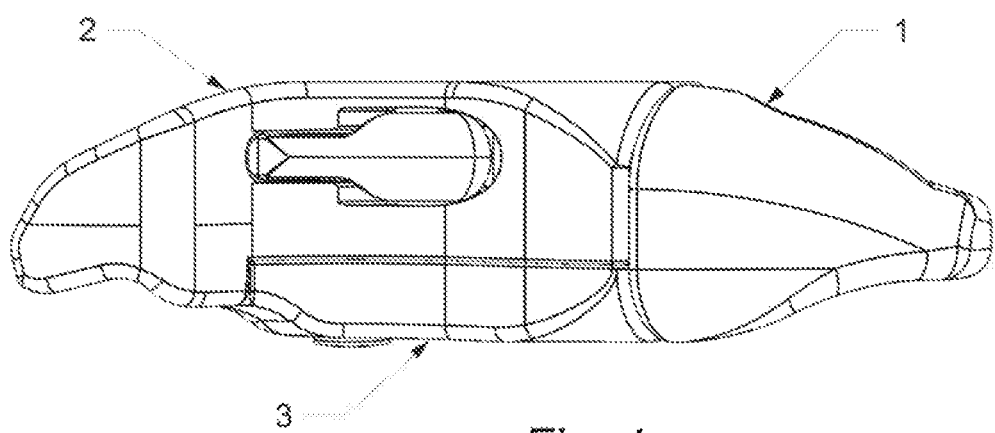
FIG. 4. Buckle Assembly: Side View.

FIG. 4 Buckle Assembly: Side View

The Compact nature of the Assembly according to one embodiment of the present invention is shown in this view. Body Part b (2) and Body Part C (3) are shown as part of the same Sub-Assembly.

FIG. 5 Buckle Assembly: Top Isometric View

The top isometric view of one embodiment of the present invention shows the interface between the two Sub-Assemblies, and the overall continuation of the fluid geometry. The rubber seals are now concealed at the curved junction between Body Part A (1) and Body Part B and C (2 and 3).

The Wings of Body Part A (1) are visible in this "locked" position and are depressed from the outside to flex the wings inwards and allow the parts to disengage.

FIG. 6 Buckle Assembly: Bottom Isometric View

The Button (4) is clearly visible in this view, with the junction between Body Part B (2) and Body Part C (3) shown. These two parts are securely bound together, for example glued, during assembly to prevent water egress or the Sub-Assembly coming apart during use.

Figure 7:
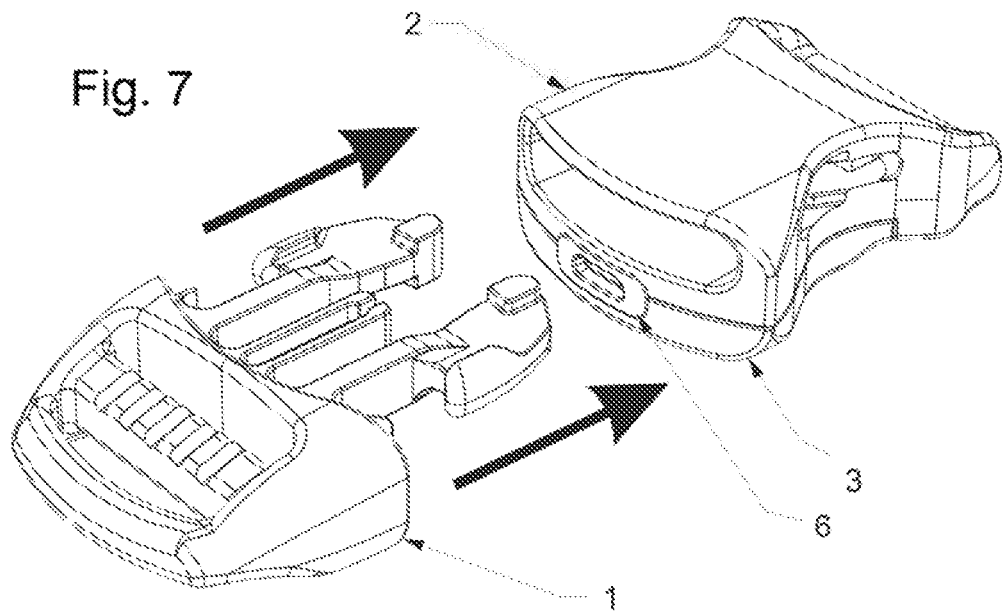
FIG. 7 Buckle Sub-Assembly: Exploded Top Isometric View.

FIG. 7 Buckle Sub-Assembly: Exploded Top Isometric View of FIG. 5

This exploded view shows the way in which the two sub-Assemblies are aligned during assembly. The arrows indicate the path of Body Part A (1) as the wings enter the cavity in Body Part B (2). During this assembly, the wings flex and then lock into position.

Figure 8:
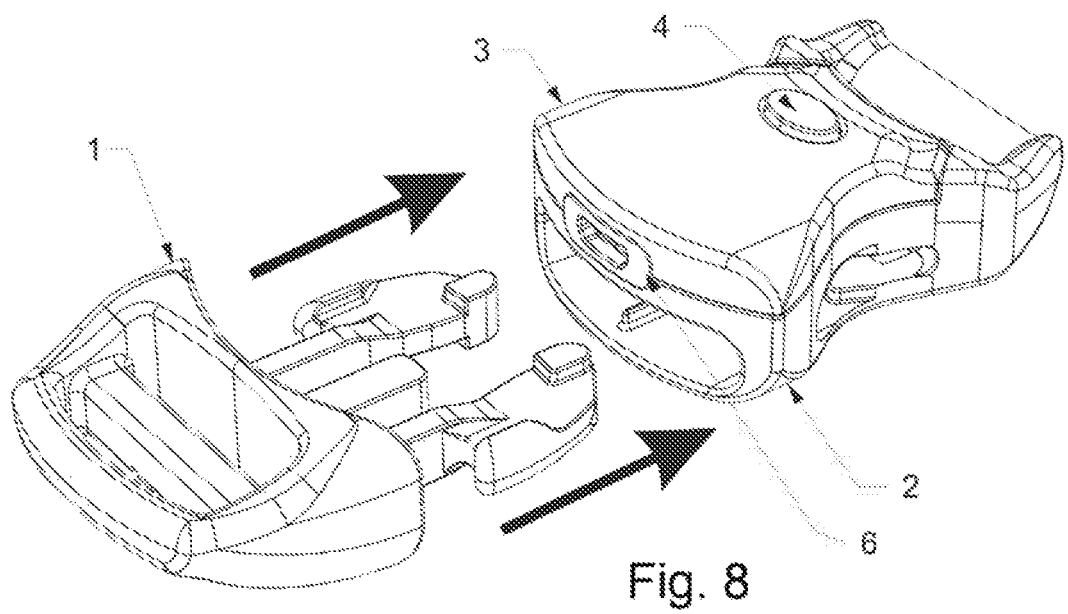
FIG. 8 Buckle Sub-Assembly: Exploded Bottom Isometric View.

FIG. 8 Buckle Sub-Assembly: Exploded Bottom Isometric View of FIG. 6

This exploded view also shows the way in which the two sub-Assemblies are aligned during assembly. The arrows indicate the path of Body Part A (1) as the wings enter the cavity in Body Part B (2). During this assembly, the wings flex and then lock into position.

Figure 9:
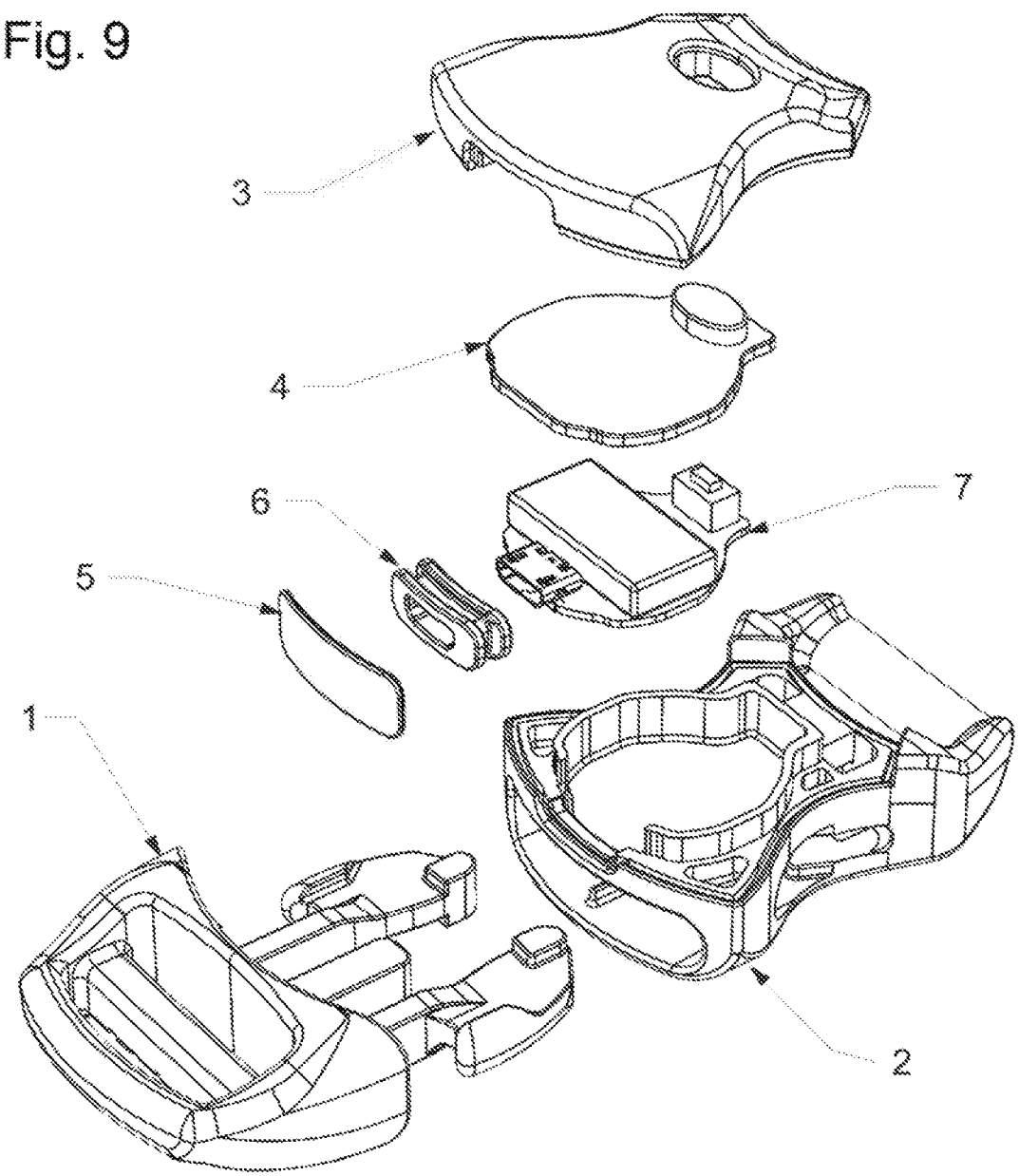
FIG. 9 Buckle Assembly: Exploded Isometric View A.

FIG. 9 Buckle Assembly: Exploded Isometric View A

All components are clearly visible in this complete exploded view. Body Part A (1), Body Part B (2), Body Part C (3), Rubber Button (4), Rubber Seal Part A insert (5), Rubber Seal Part B (6), PCB, battery, LED's, mini-USB and Switch (7).

Figure 10:
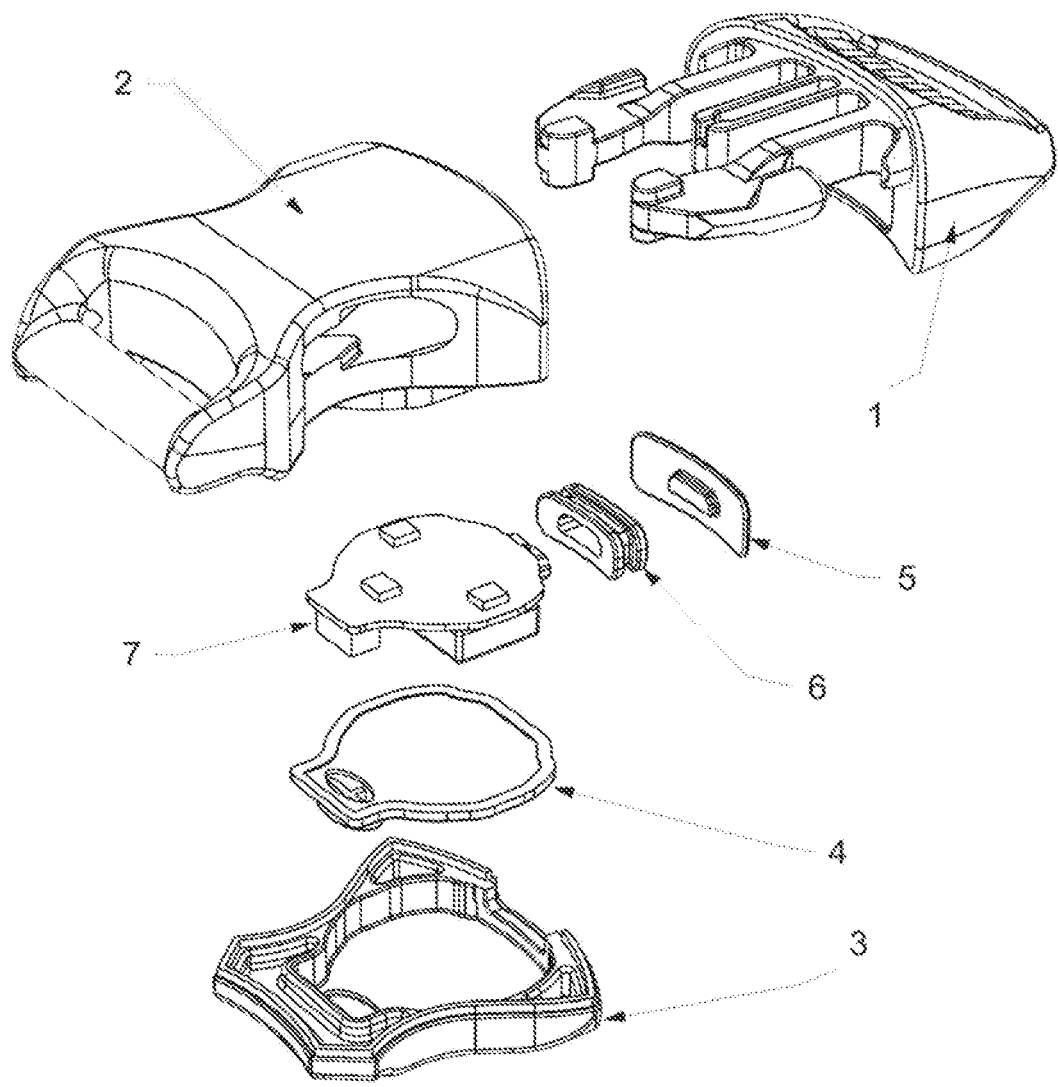
FIG. 10 Buckle Assembly: Exploded Isometric View B.

FIG. 10 Buckle Assembly: Exploded Isometric View B

All components are clearly visible in this complete exploded view. Body Part A (1), Body Part B (2), Body Part C (3), Rubber Button (4), Rubber Seal Part A insert (5), Rubber Seal Part B (6), PCB, battery, LED's, mini-USB and Switch (7).

FIG. 11 Buckle Body Part A: Isometric View

In this view the detail for the Buckle Body Part A (1) is shown. The locking teeth (1.1.) are clearly visible. The Centre Guide (1.2.) is shown and is required to ensure a clean interlock and easy assembly between the two Sub-Assemblies. The cavity for the Rubber Seal Part A is shown by 1.3. The Strap is looped over the Pull Rail (1.4.) and this needs to withstand a static pull force of 700 pounds. The strap presses up again the return loop against the second Rail (1.5.). The Curved Geometry is marked by 1.6. and flows evenly between the two Sub-Assemblies, to create a continuous form. The alignment protrusions (1.7.) are used to keep the buckle firmly aligned once assembled and locked together. The Wings (1.8.) of the Body Part A (1) are used to flex the locking teeth when opening/unlocking the buckle.

FIG. 12 Buckle Body Part B: Isometric View

The Body Part B (2) is shown with all cavities visible. The Recess for the electronics (2.1.) is shown on center with the sides (2.2.) protruding up. This engages with the Body Part C during Assembly to create a strong join point and lots of surface area to apply an adhesive for bonding the two parts together. The Pull Rail (2.3.) on this part is smooth and does not require teeth as the strap is looped and then securely stitched in place. The Recess (2.4.) is needed to accommodate the Rubber Seal Part B (6) and allow access to the Electronics during charging. The Assembly Groove (2.5.) runs all-round the edge of this part, and accepts the Edge protrusion from Body Part C (3). The locking teeth (2.6.) are shown here, and are the essential mechanical link between the Sub-Assembly A and Sub-Assembly B. There are teeth above and below on this part to allow for four locking points. Unnecessary material is removed from the part by means of voids (2.7). The alignment ridge (2.8) is shown and this slide aligning the Guide rail on Body Part A (1). This assist in ensuring an easy aligned assembly of the two Sub-Assemblies during use. The cavities (2.9) are required for molding the parts and accommodate tooling requirements.

Figure 13:
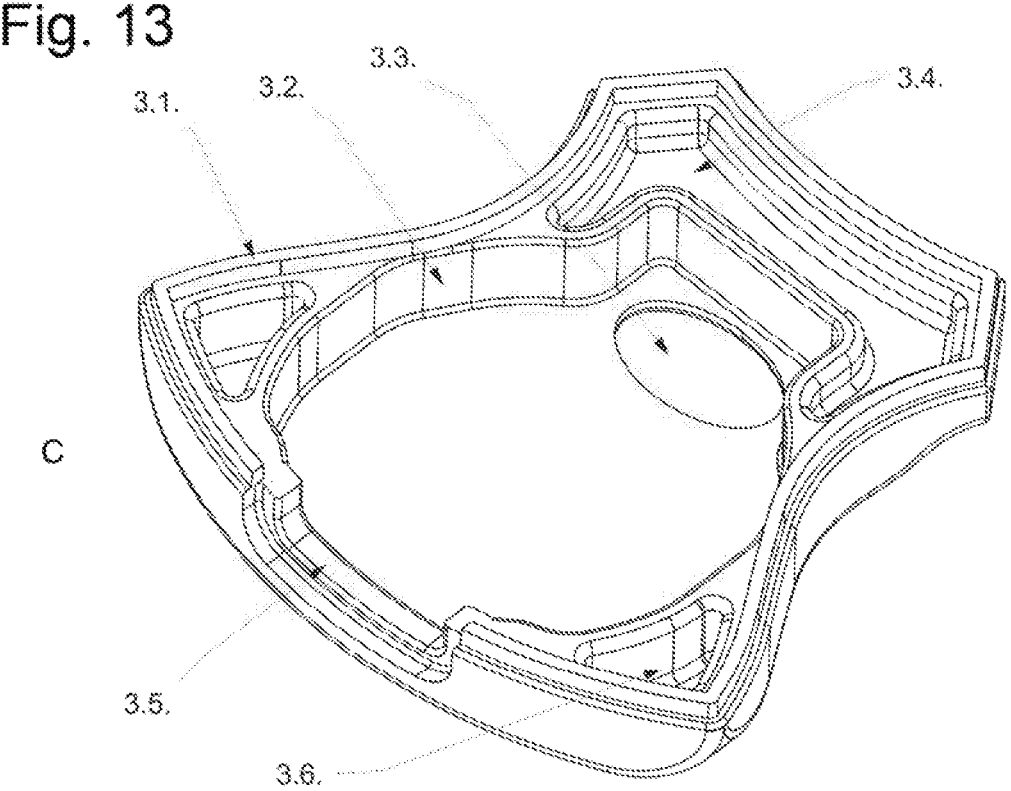
FIG. 13 Buckle Body Part C: Isometric View.

FIG. 13 Buckle Body Part C: Isometric View

The Edge protrusion from Body Part C (3.1.) runs all-round the edge of this part, and fits into the Assembly Groove (2.5.). The Cavity Sides (3.2.) locate to the cavity sides of Body Part B (2.2). The Void to allow for the Button to protrude out is indicated by 3.3. Unnecessary material is removed to create voids at 3.4. and 3.6. The cut-away (3.5) is required to accommodate the Rubber Seal Part B (6).

Figure 14:
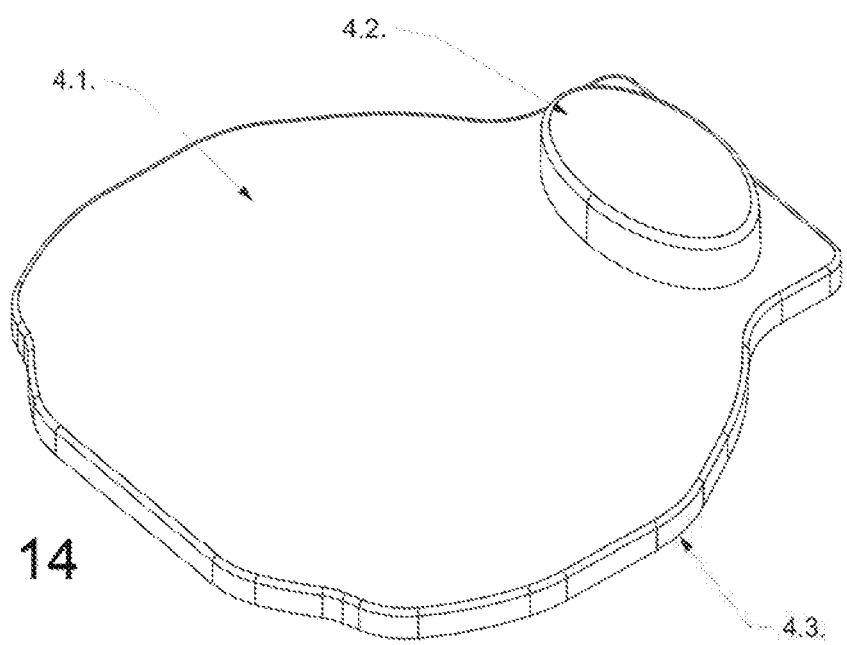
FIG. 14 Rubber Button: Isometric View.
Figure 19:
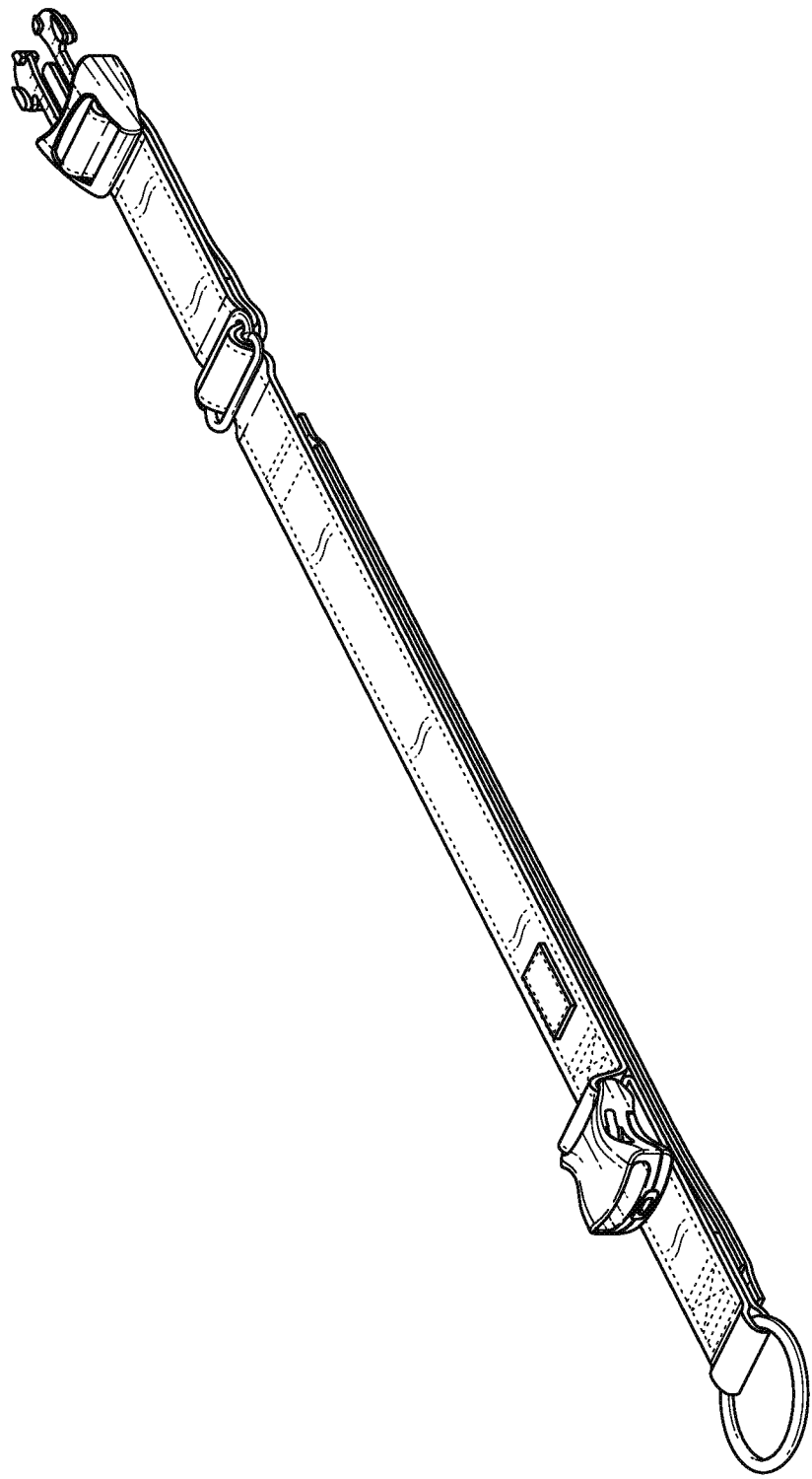
FIG. 19 is a perspective view of a buckle on a collar according to one embodiment of the present invention.
Figure 20:
FIG. 20 is a left side view of the buckle on the collar of FIG. 19.
Figure 21:
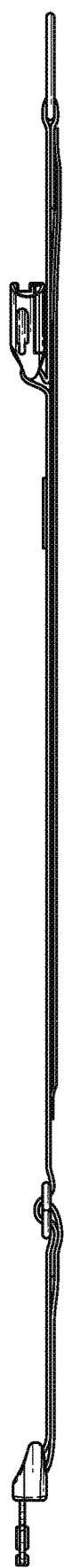
FIG. 21 is a right-side view of the buckle on the collar of FIG. 19.
Figure 23:
FIG. 23 is a back-end view of the buckle on the collar of FIG. 19.
Figure 22:
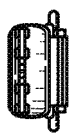
FIG. 22 is a front-end view of the buckle on the collar of FIG. 19.
Figure 24:
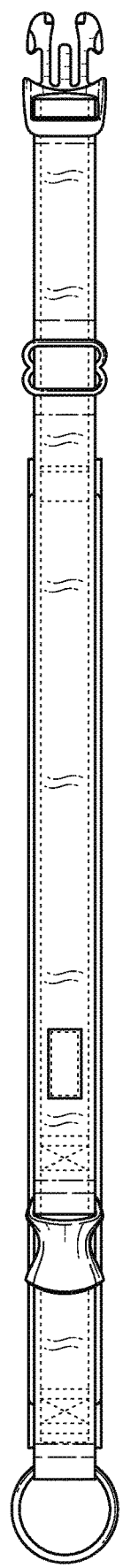
FIG. 24 is a top plan view of the buckle on the collar of FIG. 19.
Figure 25:
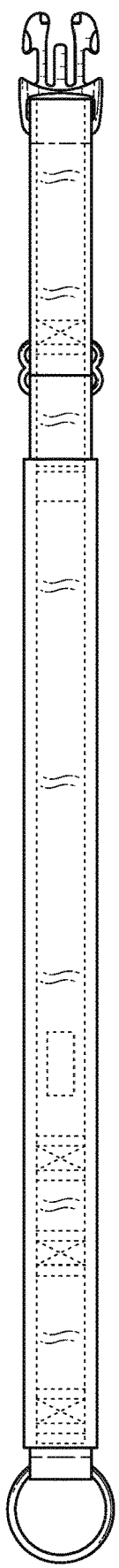
FIG. 25 is a bottom plan view of the buckle on the collar of FIG. 19.

FIG. 14 Rubber Button: Isometric View

A medium density Silicone or TPR is used to mold the Rubber Button (4) component. The flat area (4.1.) covers the electronics and acts as a visual barrier to improve aesthetics of the final assembly. The oval Button (4.2.) is visible and is the functional point of contact between the user and the switch on the PCB. The edge of this part (4.3.) is slightly thicker to create compression during assembly and prevent movement of the button or electrics.

FIG. 15 Rubber Seal Part A: Isometric View

The body of the Rubber Seal Part A (5.1.) is to be securely bonded to Body Part A (1). The protrusion (5.2.) fits into Rubber Seal Part B (6) to create a watertight join.

FIG. 16 Rubber Seal Part B: Isometric View

The Opening (6.1) allows for access to the mini-USB and also for the Rubber Seal Protrusion (5.2.) to close off this opening when the buckle is "locked" together. The surrounding edges (6.2. and 6.4.) are used to grip the Plastic Body Components and hold the Rubber Seal Part B securely in Place. The recess (6.3.) accepts plastic ridges on Body Part B (2) and Body Part C (3).

FIG. 17 PCB, Switch, mini-USB and Battery: Isometric View

The Mini-USB (7.1.), PCB (7.2.), Lithium-ion Battery (7.3.) and Switch (7.4.) are clearly visible in this view. This is a pre-assembled module that is fitted into the plastic body parts during the final stages of assembly.

FIG. 18 PCB, Switch, mini-USB and Battery: Bottom Isometric View

Three LED's (7.5.) are shown here and the location on the PCB.

Figure 26:
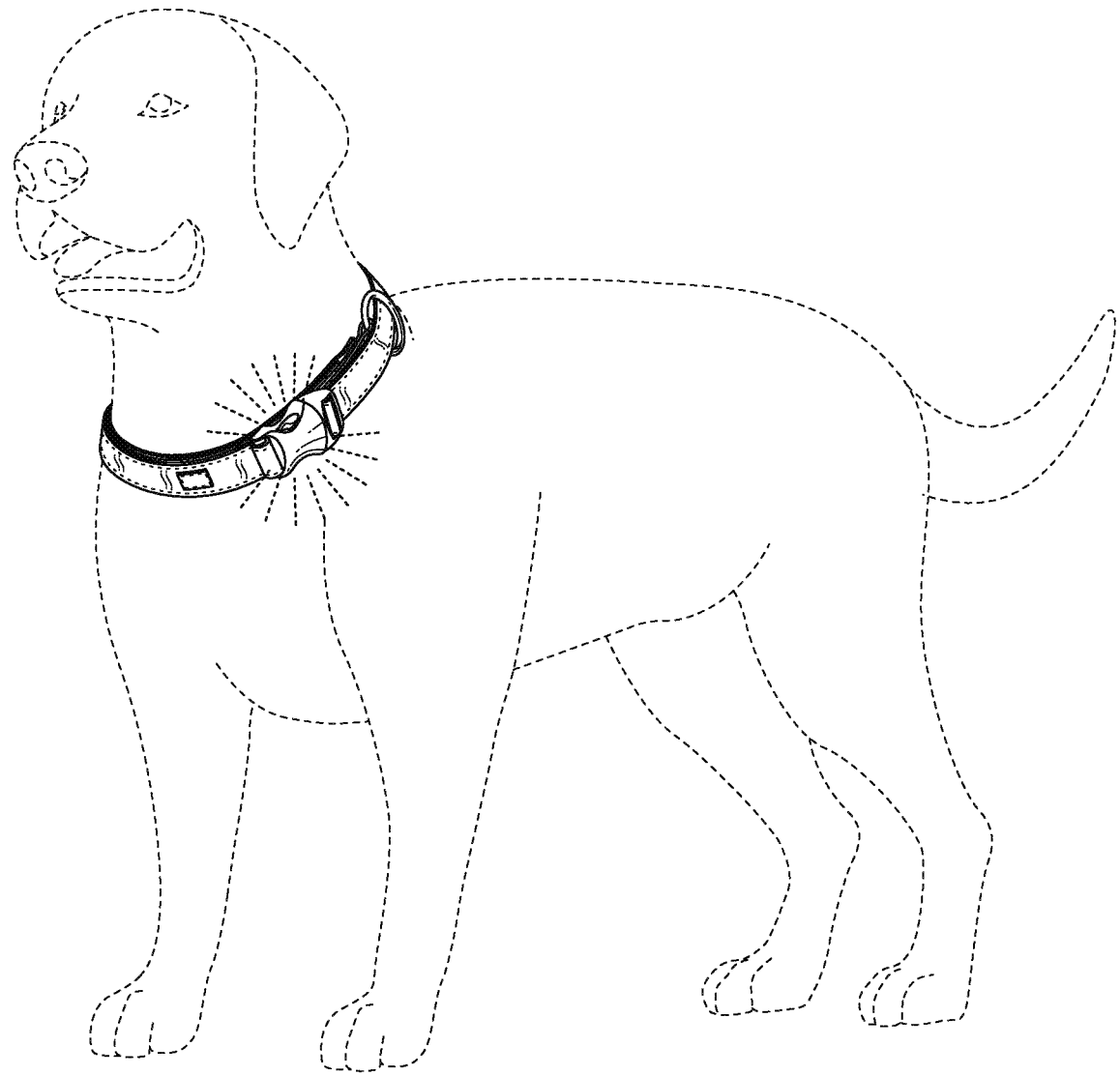
FIG. 26 is the buckle on the collar of FIG. 19 positioned around the neck of an animal shown in broken lines with a light illuminating from the collar.

FIGS. 19-26 illustrate multiple views of a buckle on a collar that can be placed around the neck of an animal according to an embodiment of the present invention. Further, FIG. 26 illustrates a light emitting from the interior of a translucent buckle wherein the light can have a predetermined sequence of on/off or the light can be in an "on" state or in an "off" state while worn by an animal. The predetermined sequence can be a sequential on to off status of the light in sequence for example, or all light on followed by all light off for a predetermined period of time for the light to be in each state to allow the light to flash.

The invention is not limited to the embodiments shown in the drawing and described in the description of the drawing. The invention is limited by the claims only.

The invention also embodies all combinations of separate embodiments that are described in this description.

Finally, the terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, denote the presence of stated features, integers, steps, operations, elements, and/or components, but do not preclude the presence or addition of one or more other features, integers, steps, operations, elements, components, and/or groups thereof.

What is claimed is:

1. A buckle for use with a strap the buckle comprising:
a part A sub-assembly and a part B sub-assembly;
the part A sub-assembly comprises wings; and
the part B sub-assembly comprises a cavity into which clips the wings of the part A sub-assembly to releasably lock the part A sub-assembly and the part B sub-assembly to form a water tight buckle wherein the part B sub-assembly contains integrated electronics and illumination and a rechargeable battery for powering the integrated electronics within the part B sub-assembly wherein the rechargeable battery comprises a USB connection for recharging the battery.

2. The buckle according to claim 1, wherein the buckle comprises a seal for shielding the electronics against water and moisture.

3. The buckle according to claim 2, wherein the seal comprises a rubber interlock between the part A sub-assembly and the part B sub-assembly.

4. The buckle according to claim 1, wherein a rubber interlock seals a mutually removable covering device around the USB connection.

5. The buckle according to claim 1, wherein the illumination comprises a LED light source.

6. The buckle according to claim 1, wherein the buckle connects with an end-part of the strap for withstanding 700 pounds of static pull force when the end part is connected with the buckle.

7. The buckle according to claim 1, wherein the illumination comprises an LED light source connected to the battery through operatively connected electronics wherein the illumination is-visible at a distance of at least 10 meters at night or in the dark.

8. The buckle according to claim 1, comprising a connection for connecting to the strapping for use on a dog collar or for connecting to a harness or other functional apparel.

* * * * *